Patented Dec. 9, 1947

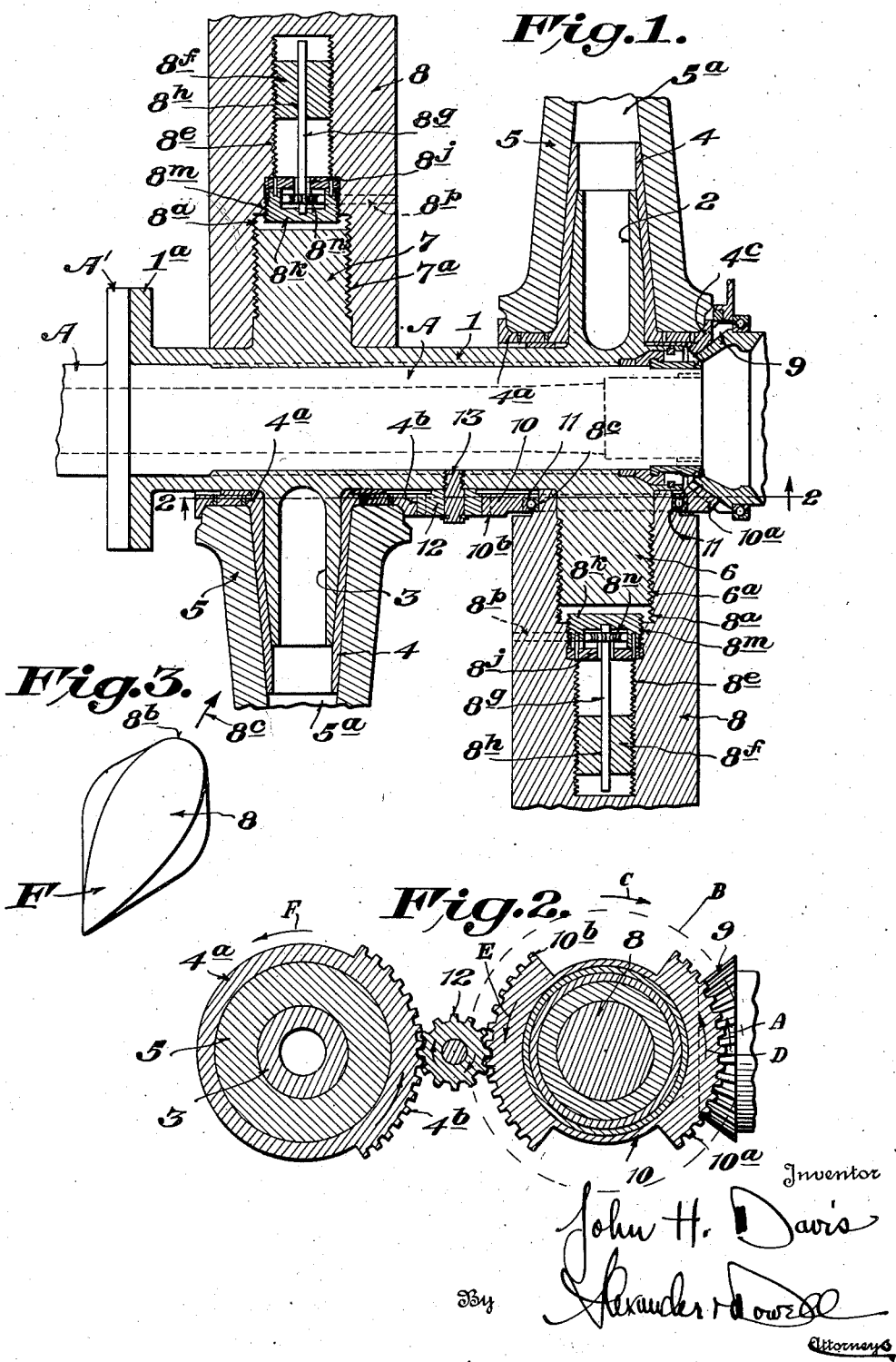

2,432,391

UNITED STATES PATENT OFFICE 2,432,391

STAGGERED PROPELLER

John H. Davis, Detroit, Mich., assignor, by mesne assignments, to Jessie A. Davis Foundation, Royal Oak, Mich., a corporation of Delaware Application November 29, 1943, Serial No. 512,169

4 Claims. (Cl. 170—163)

This invention is a novel hub for staggered propellers embodying means for simultaneously adjusting the pitch of the propeller blades and also embodying means for effecting rotatorial balance of the propeller blade and hub assembly; and the principal object of the invention is to provide a hub of the above type having means for supporting the blades in staggered relation, one in front of the other, the hub being adapted to be mounted or splined upon a propeller shaft and having blade supporting posts in spaced axial relation thereon with counter-weights disposed opposite each post, the counter-weights having incorporated therein means for balancing their respective propeller blades in the hub assembly, means being also provided whereby the propeller blades, which are rotatably mounted upon their supporting posts, may be simultaneously rotated to simultaneously vary in equal amounts the pitch of the individual blades.

Other minor objects of the invention will be hereinafter set forth.

I will explain the invention with reference to the accompanying drawing, which illustrates one practical embodiment thereof to enable others familiar with the art to adopt and use the same; and will summarize in the claims the novel features of construction and novel combinations of parts, for which protection is desired.

In said drawing—

Fig. 1 is a longitudinal section through a hub for a staggered propeller embodying my invention.

Fig. 2 is an enlarged section on the line 2—2, Fig. 1.

Fig. 3 is an end view of a counter-weight for the propeller blades.

As shown in Fig. 1, the engine shaft A has the usual bolting flange A' connected with a complementary flange 1a on the hub member 1 which is splined or otherwise secured upon the engine shaft A so as to rotate therewith, the hub extending from the flange A' to the outer end of engine shaft A so as to be securely mounted thereon and to rotate therewith as a unit. Upon hub 1a are oppositely disposed propeller blade supporting posts 2 and 3 which are spaced axially thereon so that the respective blades carried by posts 2 and 3 will be in staggered relationship, the particular spacing however forming no part of my present invention. Preferably posts 2 and 3 are hollow with the outer walls adjacent the outer ends slightly tapered for the purpose hereinafter set forth.

Mounted upon each of the posts 2 and 3 is a rotatable hollow metallic bushing 4 having an internal shape corresponding with the external shape of the posts 2 or 3, bushing 4 being somewhat longer than posts 2 or 3 and having a tapered exterior shape to suit the usual tapered bore 5a in the shank of the propeller blade 5, the bushing 4 being secured within the bore 5a in any desired manner so that the blade 5 will rotate with the bushing 4 which latter is rotatable upon the posts 2 or 3. The inner end of each metallic bushing 4 is provided with an external annular flange 4a which fits under the inner end of the shank of the propeller blade 5 and conforms with the shape thereof in order to form a firm support for the propeller blade.

Mounted on hub 1 diametrically opposite the posts 2 and 3 are counter-weight supporting posts 6 and 7 which are exteriorly threaded as at 6a and 7a to receive the tapped bores 8a of counter-weights 8, which are locked on the threaded posts 6 and 7 in any desired manner, the inner ends of the counter-weights abutting against the hub 1 adjacent the bases of posts 6 and 7 as clearly shown. Each counter-weight 8, as shown in Fig. 3, is circular in cross-section at the base and is of sufficient length to provide the proper mass for balancing its related propeller blade 5. In order to reduce wind resistance thereagainst when rotating, the shape is gradually changed from a circular shape at the base to a streamline shape 8b at the outer end as indicated in Fig. 3, the blunt portion of the streamline shape 8b being disposed at the leading edge as shown by the arrow 8c in Fig. 3. However, any other desired external shape of the counter-weight 8 may be used.

One important feature of my invention is the provision of means in the hub for simultaneously varying the pitch of the individual propeller blades 5 of the staggered propeller. As shown in Fig. 1, the usual beveled ring gear 9 is mounted coaxially of the shaft A adjacent the nose end of the hub in any desired manner such as shown in U. S. Letters Patents No. 2,268,948, issued January 6, 1942, or No. 2,300,233, issued October 27, 1942, said gear 9 being oscillatable and automatically controlled through suitable mechanism (not shown) to vary the pitch of propeller blades in accordance with the load, or same may be manually controlled. The particular mounting of ring gear 9 forms no part of my present invention, nor does the particular means for operating said gear. A special gear 10 (Figs. 1 and 2) is mounted on antifriction bearings 11 on a reduced annular shoulder 8c on the counter-balance 8 adjacent the ring gear 9, said special gear having formed thereon an arcuate series of beveled teeth 10a extending throughout about ⅓ the circumference of gear 10 and meshing directly with beveled teeth of the blade pitch adjusting ring gear 9 so as to be oscillated thereby. As ring gear 9 is not required to make a complete revolution in adjusting the pitch of the blades 5 it is not necessary that the beveled gear teeth 10a of special gear 10 extend more than approximately ⅓ of the periphery of gear 10.

Formed on the periphery of gear 10, diametrically opposite from the beveled teeth 10a, is a series of spur teeth 10b (Figs. 1 and 2) which mesh directly with the spur teeth of an idler gear 12 mounted upon a stud 13 secured to and extending from the hub 1 between gear 10 and the adjacent blade supporting post 3, idler gear 12 meshing directly with teeth 4b formed on the periphery of flange 4a of the metallic bushing 4 which supports the propeller blade 5 which is carried by post 3. The beveled ring gear 9, above mentioned, also meshes directly with beveled teeth 4c (Fig. 1) formed on the periphery of flange 4a of the metallic bushing 4 which supports the leading propeller blade 5. By the above construction, as the beveled ring gear 9 is rotated, either manually or automatically, the leading propeller blade 5 on the post 2 will be directly rotated by the ring gear 9 in one direction, while the trailing propeller blade 5 on the post 3 will be rotated a corresponding amount in the reverse direction.

Fig. 2 is a section on the line 2—2, Fig. 1, looking up at the lower periphery of the bevel drive gear 9. In Fig. 2 the arrow A on gear 9 shows the direction of assumed rotation of the lower periphery of the bevel gear. The dotted circle B indicates the propeller 5 which is disposed opposite the adjacent hub extension 8, and since the gear on the propeller B is in mesh with the upper periphery of the bevel gear 9 (rather than the lower periphery) and the upper periphery of gear 9 is rotating in the opposite direction from the arrow A, the propeller denoted by the dotted line B will obviously rotate in the direction of the arrow C. The segment 10a on the idler gear meshing with the lower periphery of the bevel gear 9 will rotate in the direction of the arrow D, i. e., in the same direction as the lower periphery of the bevel gear 9, while the gear segment 10b at the opposite side of the idler gear 10 will rotate in the direction of the arrow E. Due to the use of the idler gear 12 the diametrically opposite propeller blade 5 will rotate in the direction of the arrow F. Thus an inspection of the arrows C and F clearly shows that the diametrically opposed propellers are rotated in opposite directions. However, the leading edge of the propellers will be rotated in the same direction with respect to the oncoming column of air to simultaneously adjust the pitch of the propellers in the same direction. Thus it is obvious that in an arrangement of diametrically opposite propellers in order to adjust the pitch in the same direction the blades must be rotated in opposite directions.

The above forms a simple and efficient means for rotating the respective blades on their posts 2 and 3 in opposite directions simultaneously, it being necessary to rotate the blades in opposite directions since the two blades carried by the posts 2 and 3 are disposed diametrically opposite each other with respect to the hub. In event three or more blades were mounted upon the hub, instead of the two shown in Fig. 1, the adjustment could be readily effected by proper selection of gearing from the above train to include the additional propeller blades.

Another important feature of my invention is the provision of rotatorial balancing means for the staggered propeller assembly mounted directly in the respective counterweights 8 which are disposed opposite their related blades 5. As shown in Fig. 1, each counter-weight 8 is provided at the base of its threaded bore 8a with a reduced threaded bore 8e of substantial length in which is threaded a balancing weight 8f of sufficient mass to balance the counter-weight 8 and its related blade 5 at each end of the hub.

In order to shift the balancing weights 8f in their bores 8e, means may be provided such as shown in my copending application Serial No. 434,772, filed March 14, 1942 (now Patent No. 2,339,624, issued January 18, 1944), each weight 8f having a non-circular bore 8h therein adapted to receive a correspondingly shaped shaft 8g extending therethrough, the inner end of shaft 8g being journaled in a bushing 8j carried by a removable head 8k threaded into an enlargement 8m of bore 8e, as clearly disclosed in my aforesaid copending application, the head 8k housing a worm (not shown) meshing with a worm gear 8n mounted upon the non-circular shaft 8g. A suitable key inserted through a bore 8p is used to actuate the worm which rotates worm gear 8n, thereby rotating the shaft 8g, causing the balancing weight 8f to be shifted axially of bore 8e.

By the above construction, each counter-weight 8 and its related blade 5 may be readily adjusted for accurate rotational balance without having to assemble or disassemble any parts of the hub and blade assembly, it only being necessary to insert the key, such as an Allen head wrench, within the bore 8p which extends through the side of the counterweight 8 and make the necessary adjustments for rotatorially balancing the assembly at each end of the hub.

My novel hub is simple and efficient and provides ready means for varying simultaneously the pitch of the staggered propeller blades 5 mounted upon the spaced supporting posts 2 and 3; and at the same time provides ready means whereby the entire assembly, including the blades 5, counter-weights 8 and the hub 1 may as a whole be readily adjusted for rotatorial balance, which is essential for efficient operation.

I do not limit my invention to the exact form shown in the drawing, for obviously changes may be made therein within the scope of the claims.

I claim:

1. In combination, a propeller hub; radially disposed axially spaced posts thereon; blades rotatably mounted on the respective posts; a gear on said hub operated by blade pitch control mechanism; means actuated by the gear for simultaneously rotating the blades to vary the pitch of the blades; said means comprising a second gear carried by the shank of one blade and meshing with the first gear; a third gear carried by the shank of another blade; and intermediate gears journaled on the hub and connecting the first and third gears.

2. In combination, a propeller hub; radially disposed axially spaced posts thereon; blades rotatably mounted on the respective posts; an axially disposed bevel gear on said hub operated by blade pitch control mechanism; said gear being disposed adjacent one said post; means actuated by the gear for simultaneously rotating the blades to vary the pitch of the blades; said means comprising a second bevel gear carried by the shank of the blade on said post adjacent the first gear and meshing therewith; a third gear carried by the shank of the blade on another post; and intermediate gears journaled on the hub and connecting the first and third gears.

3. In combination, a propeller hub; radially disposed axially spaced posts thereon; blades rotatably mounted on the respective posts; an axially disposed bevel gear on said hub operated by blade pitch control mechanism and disposed adjacent one said post; a second bevel gear carried by the shank of the blade adjacent the first gear and meshing therewith; a member journaled on a lateral extension of the hub disposed normal to the axis thereof and having a bevel gear sector meshing with the first bevel gear, said member having a spur gear sector; and a third gear carried by the shank of another blade and driven by the spur gear sector of said member, whereby said blades will be rotated simultaneously by the first gear to vary the pitch of the blades.

4. In a combination as set forth in claim 3, said posts being disposed 180° apart; and an idler gear interposed between the third gear and spur sector, whereby the blades will be rotated in opposite directions.

JOHN H. DAVIS.

REFERENCES CITED

The following references are of record in the file of this patent:

UNITED STATES PATENTS

| Number | Name | Date |
| --- | --- | --- |
| 2,215,564 | Rask | Sept. 24, 1940 |
| 2,071,513 | Everts | Feb. 23, 1937 |
| 2,339,624 | Davis | Jan. 18, 1944 |
| 2,123,057 | Martin | July 5, 1938 |
| 1,903,817 | Johnson | Apr. 18, 1933 |
| 2,234,120 | Hawkins | Mar. 4, 1941 |
| 2,124,369 | Everts | July 19, 1938 |
| 1,900,839 | Minto | Mar. 7, 1933 |
| 766,953 | Krebs | Aug. 9, 1904 |
| 712,677 | Hewson | Nov. 4, 1902 |
| 2,197,814 | Taber | Apr. 23, 1940 |
| 2,338,420 | Freitag | Jan. 4, 1944 |
| 2,324,650 | Stepanoff | July 20, 1943 |

FOREIGN PATENTS

| Number | Country | Date |
| --- | --- | --- |
| 483,760 | Great Britain | Apr. 26, 1938 |